(12) United States Patent
Sumser et al.

(10) Patent No.: US 7,540,149 B2
(45) Date of Patent: *Jun. 2, 2009

(54) TURBOCHARGER COMPRESSOR WITH AN AUXILIARY ROTOR WHEEL AND MAGNETIC CLUTCH

(75) Inventors: Siegfried Sumser, Stuttgart (DE); Peter Fledersbacher, Stuttgart (DE)

(73) Assignee: Daimler AG, Stuttgart (DE)

( * ) Notice: Subject to any disclaimer, the term of this patent is extended or adjusted under 35 U.S.C. 154(b) by 182 days.

This patent is subject to a terminal disclaimer.

(21) Appl. No.: 11/655,955

(22) Filed: Jan. 19, 2007

(65) Prior Publication Data

US 2007/0125082 A1   Jun. 7, 2007

Related U.S. Application Data

(63) Continuation-in-part of application No. PCT/EP2005/004140, filed on Apr. 19, 2005.

(30) Foreign Application Priority Data

Jul. 20, 2004   (DE) .................. 10 2004 035 044

(51) Int. Cl.
| | |
|---|---|
| F02B 33/44 | (2006.01) |
| F02B 37/00 | (2006.01) |
| F02B 37/013 | (2006.01) |
| F01D 17/14 | (2006.01) |
| F16D 27/00 | (2006.01) |
| F16D 27/01 | (2006.01) |
| F02C 6/12 | (2006.01) |

(52) U.S. Cl. ........................ 60/605.1; 415/158

(58) Field of Classification Search ............. 60/605.1; 415/158–160

See application file for complete search history.

(56) References Cited

U.S. PATENT DOCUMENTS

| | | | | |
|---|---|---|---|---|
| 2,488,552 | A | * | 11/1949 | Oetzel ............... 192/84.93 |
| 2,939,023 | A | * | 5/1960 | Henri ............... 310/105 |
| 3,037,601 | A | * | 6/1962 | Binder ............... 192/84.91 |
| 3,588,558 | A | * | 6/1971 | Levin ............... 310/95 |
| 3,908,492 | A | * | 9/1975 | Roskelley ............... 82/143 |
| 4,535,592 | A | * | 8/1985 | Zinsmeyer ............... 60/597 |
| 5,406,796 | A | | 4/1995 | Hiereth et al. |
| 5,791,039 | A | * | 8/1998 | Tabuchi et al. ............... 29/602.1 |
| 6,129,193 | A | * | 10/2000 | Link ............... 192/84.1 |
| 6,378,307 | B1 | * | 4/2002 | Fledersbacher et al. .... 60/605.2 |
| 6,481,205 | B2 | * | 11/2002 | Fledersbacher et al. .... 60/605.1 |
| 2003/0079727 | A1 | * | 5/2003 | Stretch ............... 123/559.3 |
| 2003/0167767 | A1 | | 9/2003 | Arnold |
| 2004/0216458 | A1 | * | 11/2004 | Spooner ............... 60/608 |
| 2007/0144172 | A1 | * | 6/2007 | Sumser et al. ............... 60/605.1 |

FOREIGN PATENT DOCUMENTS

| | | |
|---|---|---|
| DE | 197 36 797 | 2/1999 |
| DE | 19736797 A1 * | 2/1999 |
| DE | 199 55 508 | 4/2001 |
| DE | 100 61 847 | 6/2002 |

* cited by examiner

*Primary Examiner*—Thomas E. Denion
*Assistant Examiner*—Mary A Davis
(74) *Attorney, Agent, or Firm*—Klaus J. Bach

(57) ABSTRACT

In a compressor of an exhaust gas turbocharger of an internal combustion engine including a compressor wheel with an auxiliary rotor wheel which is rotatably supported adjacent to, and upstream of, the compressor wheel and which is movable axially between a coupled position with the compressor wheel and a decoupled position, wherein, in the coupled position, the auxiliary rotor wheel is rotationally connected to the compressor wheel, without contacting the compressor wheel, by means of a magnetic clutch for transferring a torque from the auxiliary rotor wheel to the compressor wheel in a low engine power operating range in order to maintain the compressor wheel at an increased speed.

8 Claims, 3 Drawing Sheets

TURBOCHARGER COMPRESSOR WITH AN AUXILIARY ROTOR WHEEL AND MAGNETIC CLUTCH

This is a Continuation-in-Part application of pending International patent application PCT/EP2005/004140 filed Apr. 19, 2005 and claiming the priority of German patent application 10 2004 035 044.2 filed Jul. 20, 2004.

BACKGROUND OF THE INVENTION

The invention relates to a compressor in an exhaust gas turbocharger for an internal combustion engine wherein the compressor has a compressor wheel which is rotatably supported in a compressor inlet duct together with an auxiliary rotor arranged adjacent the compressor wheel.

DE 100 61 847 A1 discloses an exhaust gas turbocharger having an exhaust gas turbine in the exhaust system and having a compressor in the intake tract of the internal combustion engine. Mounted upstream of the compressor wheel in the inlet duct of the compressor is a separate auxiliary rotor wheel, which is situated upstream of the compressor wheel in the flow direction of the combustion air which is supplied via the inlet duct. The auxiliary rotor wheel has the function of favorably influencing the operating behavior of the compressor by a displacement of the surge limit and the choke limit of the compressor for the benefit of an expanded operating characteristics diagram. The auxiliary rotor wheel rotates independently of the compressor wheel and is driven by an electric motor.

A coupling between a blocking element for adjusting the free flow cross section in the compressor inlet duct and the compressor wheel is described in DE 103 10 650 A1. The blocking element is the support of a stator of an electric motor, and an associated rotor is fixedly connected to the compressor wheel of the compressor. The blocking element is axially adjustable in the compressor inlet duct, with the stator and the rotor assuming a functional position, in which additional drive energy is introduced into the compressor wheel, when the blocking element is in a position close to the compressor wheel. It is possible in this way, in particular at low loads and speeds of the internal combustion engine, at which only a low exhaust gas pressure is available for driving the turbine of the exhaust gas turbocharger, to keep the charger speed at an increased level. A prerequisite, however, is the introduction of electrical drive energy.

DE 199 55 508 C1 discloses an exhaust gas turbocharger for an internal combustion engine whose compressor has an additional flow duct parallel to the compressor inlet duct, with the additional flow duct opening out radially towards the compressor wheel blades. This makes it possible for air to be introduced via the additional duct to the radial outer side of the compressor wheel blades, so that a rotational drive impetus can be imparted to the compressor wheel blades in operating states of the internal combustion engine in which a low pressure vacuum prevails at the cylinder inlets. The prevailing pressure drop across the compressor in the operating states is therefore utilized to drive the compressor wheel, the compressor being driven in the so-called cold air turbine mode, making it possible for the charger speed of the exhaust gas turbocharger to remain at an increased level in all operating ranges.

Based on the prior art, it is the object of the present invention to keep the charger speed in the exhaust gas turbocharger at a high level in all operating ranges of the internal combustion engine using simple design measures. This should expediently take place without the introduction of additional drive energy.

SUMMARY OF THE INVENTION

In a compressor of an exhaust gas turbocharger of an internal combustion engine including a compressor wheel with an auxiliary rotor wheel which is rotatably supported adjacent to, and upstream of, the compressor wheel and which is movable axially between a coupled position with the compressor wheel and a decoupled position, wherein, in the coupled position, the auxiliary rotor wheel is rotationally connected to the compressor wheel, without contacting the compressor wheel, by means of a magnetic clutch for transferring a torque from the auxiliary rotor wheel to the compressor wheel in a low engine power operating range in order to maintain the compressor wheel at an increased speed.

This configuration has several advantages: firstly, in the state of coupling between the compressor wheel and the auxiliary rotor wheel, the compressor can be driven at low engine loads and low engine speeds in the cold air turbine mode in which the pressure drop across the compressor is utilized to drive the charger. The auxiliary rotor wheel assumes a turbine function and can be specifically matched to the flow conditions of the turbine mode, and no design changes are required to the compressor wheel in order to permit operation in the cold air turbine mode. The coupled position between the compressor wheel and the auxiliary rotor wheel is assumed at low loads and speeds of the internal combustion engine, so that the combustion air is sucked in as a result of the pressure drop prevailing across the compressor and drives the auxiliary rotor wheel which is embodied as a turbine wheel. The drive torque of the auxiliary rotor wheel is also transmitted to the compressor wheel, and therefore to the charger shaft, by way of the magnetic coupling between the auxiliary rotor wheel and the compressor wheel.

The magnetic clutch between the compressor wheel and the auxiliary rotor wheel, which is active only when the auxiliary rotor wheel is moved closer to the compressor wheel, operates without contact and without wear, thus increasing the service life and eliminating friction losses. The transferring movement between the coupled position and the decoupled position can be carried out in particular without friction.

A further advantage is that, depending on the degree of proximity between the auxiliary rotor wheel and the compressor wheel, a variably intense magnetic coupling is provided between the two rotatable components, resulting in a correspondingly variably intense rotational coupling. The maximum degree of rotational coupling between the auxiliary rotor wheel and the compressor wheel is provided in the coupled position, in particular with the auxiliary rotor wheel rotating in a rotationally fixed fashion with respect to the compressor wheel. In intermediate positions between the coupled position and the decoupled position, the degree of rotational coupling is in contrast less intense, so that relative rotational movements between the auxiliary rotor wheel and the compressor wheel are fundamentally possible. In this way, the contribution of the auxiliary rotor wheel to increasing or maintaining the speed of the compressor wheel is variably adjustable as a function of the axial position of the auxiliary rotor wheel.

At idle speed of the internal combustion engine, the auxiliary rotor wheel is expediently in the coupled position with the compressor wheel. As the auxiliary rotor wheel is displaced in the direction of the decoupled position, the auxiliary rotor wheel provides an ever-decreasing proportion of the drive force for rotating the compressor wheel, as the load and speed of the internal combustion engine increase. As the proportion decreases, the compression power of the compressor wheel increases.

A continuous smooth transition in the transfer of the auxiliary rotor wheel from the coupled position to the decoupled position and vice versa is possible.

The inlet flow geometry of the auxiliary rotor wheel is also expediently to be varied by means of the axial position adjustment of the auxiliary rotor wheel. This can for example be provided in that a guide vane structure is arranged in the inlet flow region of the auxiliary rotor wheel and the effective flow cross section through the guide vane structure is varied as a function of the axial position of the auxiliary rotor wheel.

The magnetic coupling is generated by means of a magnetic clutch which advantageously comprises two clutch parts which interact in the coupled position and are fixedly connected to the compressor wheel and to the auxiliary rotor wheel respectively. The two clutch parts preferably include at least one permanent magnet which is for example of cylindrical design and can engage in a ring-shaped counterpart. Said ring-shaped counterpart can have magnetically conductive windings, can be composed of magnetically conductive plates which are stacked to form packs, or can likewise be embodied as a permanent magnet.

Expedient embodiments of the invention will be described below on the basis of the accompanying drawings:

DESCRIPTION OF EXPEDIENT EMBODIMENTS

In the figures, identical components are provided with the same reference symbols.

Figure 1:
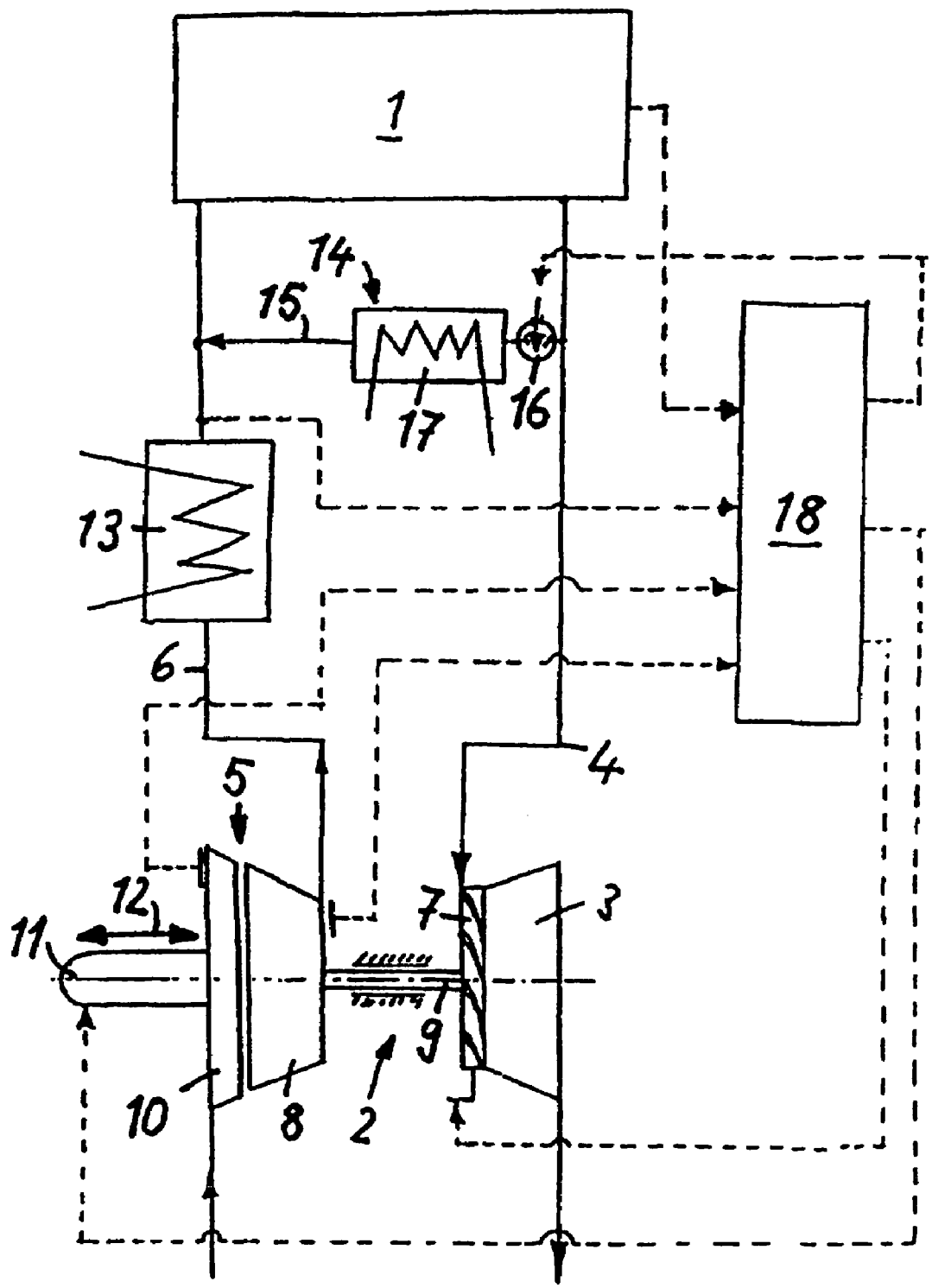
FIG. 1 is a schematic illustration of a charged internal combustion engine, with an exhaust gas turbo-charger including a compressor having an axially adjustable auxiliary rotor wheel in addition to the compressor wheel.

The internal combustion engine 1 shown in FIG. 1—a gasoline engine or a diesel internal combustion engine—includes an exhaust gas turbocharger 2 which comprises an exhaust gas turbine 3 in the exhaust system 4 and a compressor 5 in the intake tract 6. During operation of the internal combustion engine, the exhaust gas turbine 3 is driven by the pressurized exhaust gases of the internal combustion engine. The rotation of the turbine wheel is transmitted via a shaft 9 to the compressor wheel 8 in the compressor 5 in which combustion air introduced from the environment is compressed to an increased charge pressure. In the intake tract 6, the compressed air is initially cooled in a charge air cooler 13 and is subsequently supplied at charge pressure to the cylinders of the internal combustion engine.

The exhaust gas turbine 3 is equipped with variable turbine geometry 7 for variably adjusting the effective turbine inlet cross section. The behavior of the exhaust gas turbine can be improved both in the powered drive operating mode and also in the engine braking mode by means of the variable turbine geometry 7.

The compressor 5 of the exhaust gas turbocharger 2 has, in addition to the compressor wheel 8, an auxiliary rotor wheel 10 which is mounted axially adjacent to, and upstream of, the compressor wheel 10. The auxiliary rotor wheel 10 is arranged in an axially displaceable fashion in the compressor 5. The auxiliary rotor wheel 10 is acted on by an adjusting element 11 and can perform an axial adjusting movement as illustrated by the arrow 12. Here, the auxiliary rotor wheel 10 is to be adjusted between a coupled position, in which the auxiliary rotor wheel and the compressor wheel are rotationally coupled, and a decoupled position in which the compressor wheel 8 can rotate independently of the auxiliary rotor wheel 10.

The internal combustion engine 1 is additionally assigned an exhaust gas recirculation system 14 which comprises a recirculation line 15 extending between the exhaust system 4 upstream of the exhaust gas turbine 3 and the intake tract 6 downstream of the charge air cooler 13. An adjustable recirculation valve 16 and an exhaust gas cooler 17 are arranged in the recirculation line 15. In part-load operation in particular, part of the exhaust gas mass flow is recirculated via the exhaust gas recirculation device 14 into the intake tract, in order to reduce the $NO_x$ emissions of the internal combustion engine.

All the adjustable devices of the internal combustion engine are to be adjusted by means of control and adjustment signals of a closed-loop and open-loop control unit 18 as a function of state variables and operating variables of the internal combustion engine and of the devices. This relates in particular to the variable turbine geometry 7, the adjusting element 11 in the compressor 5 and the recirculation valve 16 in the exhaust gas recirculation device 14.

Figure 2:
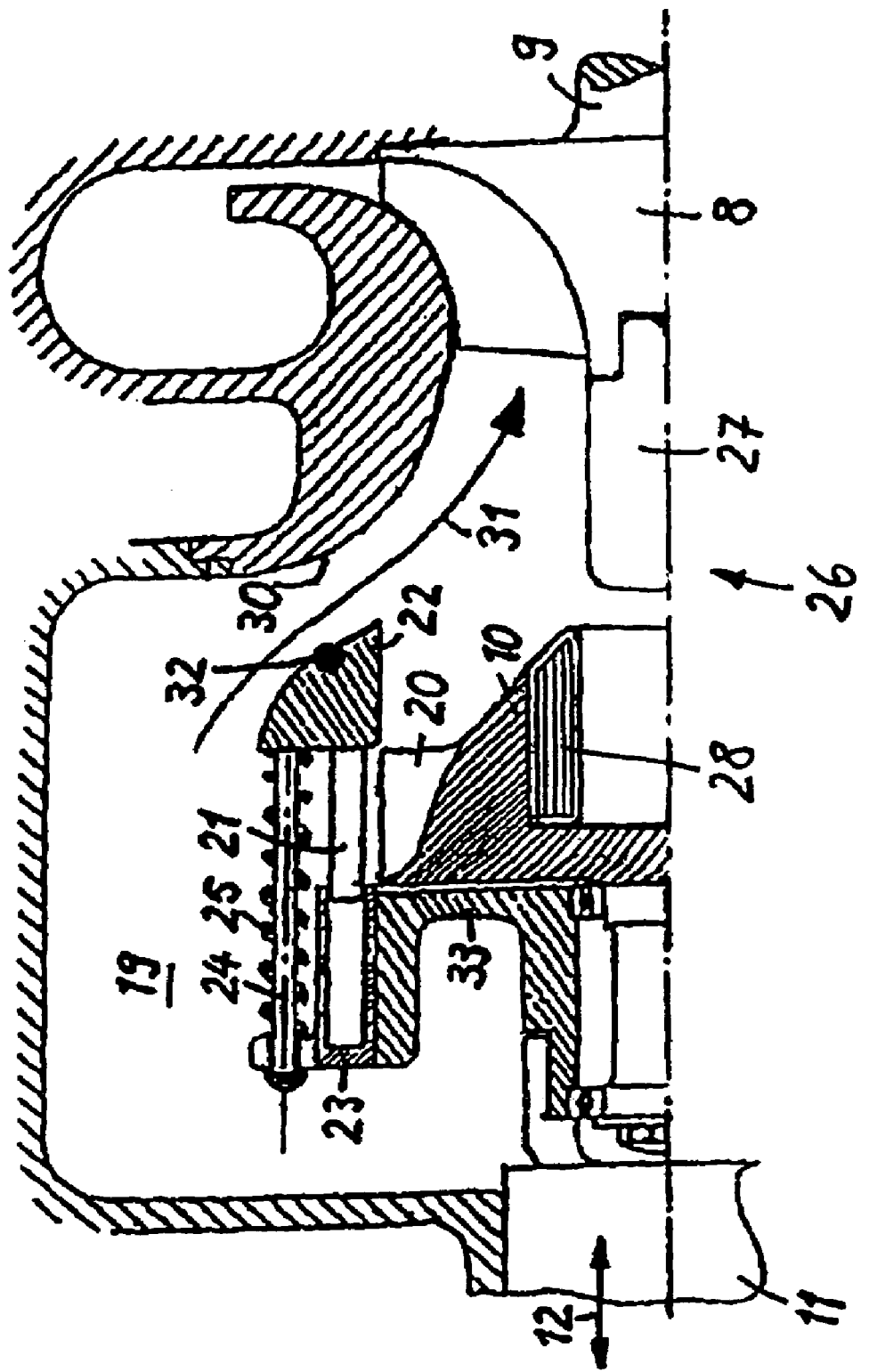
FIG. 2 is a sectional view of the compressor with the auxiliary rotor wheel in the decoupled position.
Figure 3:
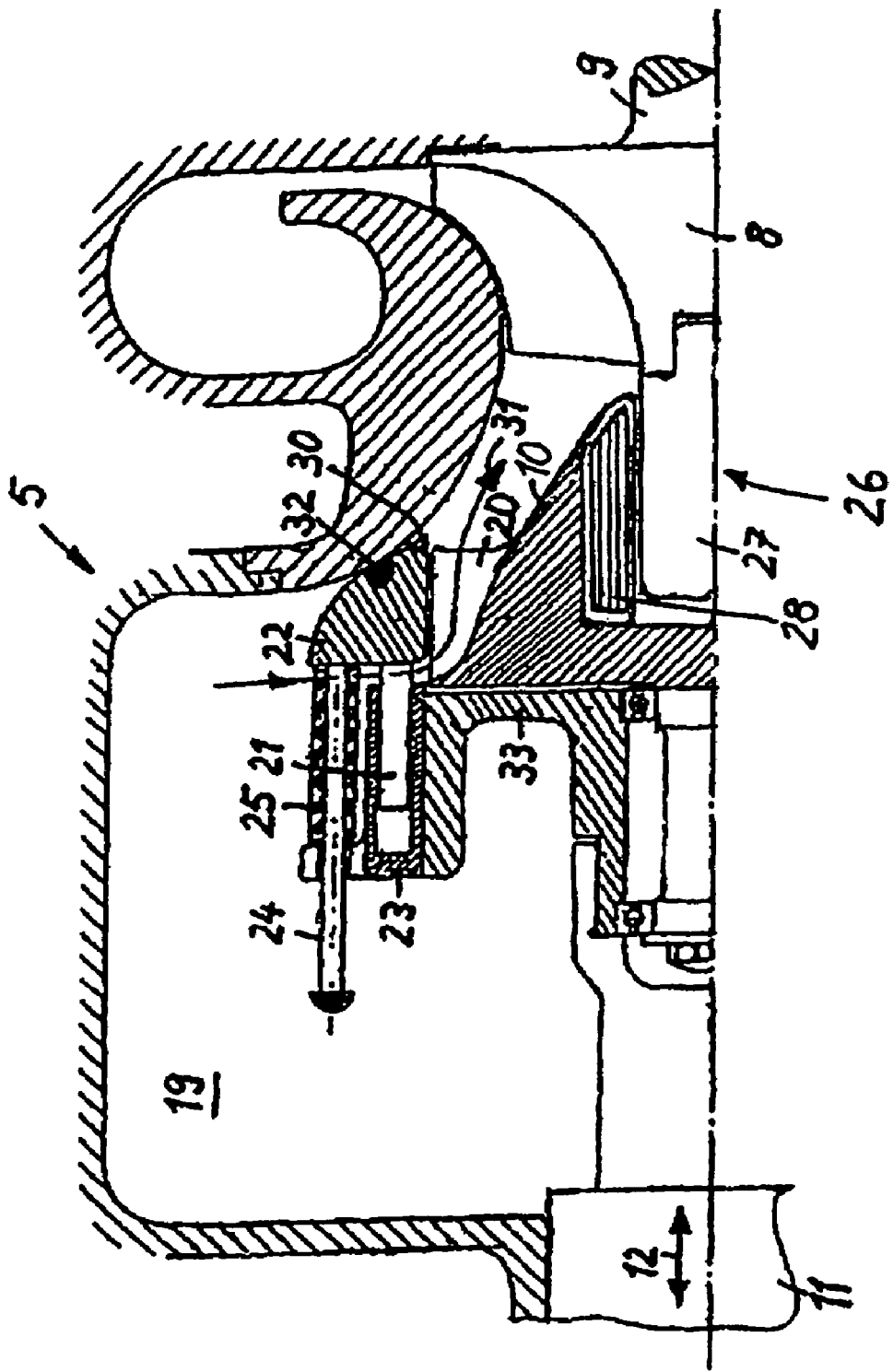
FIG. 3 shows the auxiliary rotor wheel in a position close to the compressor wheel (coupled position) and the guide vane structure in its blocking position which minimizes the flow cross section.

As can be seen from the sectioned illustration in FIG. 2, the auxiliary rotor wheel 10 is mounted axially upstream of the compressor wheel 8 in the compressor inlet duct 19, the auxiliary rotor wheel 10 being supported in an axially displaceable fashion. For this purpose, the auxiliary rotor wheel 10 is coupled to the adjusting element 11 which can be displaced axially as per arrow 12. The auxiliary rotor wheel 10 can be displaced from a decoupled position illustrated in FIG. 2 to a coupled position with the compressor wheel 8 as shown in FIG. 3, in which coupled position the compressor wheel 8 and the auxiliary rotor wheel 10 are rotationally interconnected. The coupling is produced by means of a magnetic clutch 26 which acts between the auxiliary rotor wheel 10 and the compressor wheel 8 and comprises two clutch parts 27 and 28, the first clutch part 27 of which is rotationally fixedly connected to the compressor wheel 8 and the second clutch part 28 of which is rotationally fixedly connected to the auxiliary rotor wheel 10. The first clutch part 27 is rotationally symmetrical, that is particularly of cylindrical design, and extends axially to the end 29 of the compressor wheel 8. The second clutch part 28 is of ring-shaped design and bears against the adjacent end side of the auxiliary rotor wheel 10. In the closest position of the auxiliary rotor wheel 10 to the compressor wheel 8—the coupled position shown in FIG. 3, the cylindrical coupling part 27 fully engages the ring-shaped clutch part 28, whereas in the decoupled position as per FIG. 2, the clutch parts 27 and 28 are not in engagement with one another. Any desired intermediate positions between the coupled position and the decoupled position are possible.

In the coupled position, the magnetic clutch 26 generates magnetic non-positive engagement between the clutch parts 27 and 28 and between the compressor wheel 8 and the auxiliary rotor wheel 10. The non-positive engagement is generated without friction or wear as the clutch parts do not make contact with one another in the engaged position. The non-positive engagement produces a rotational coupling between the compressor wheel 8 and the auxiliary rotor wheel 10, it being fundamentally possible for the rotational coupling to be rotationally fixed, so that the compressor wheel 8 and the auxiliary rotor wheel 10 rotate together at the same speed. It is also possible for speed differences to be produced between the compressor wheel 8 and the auxiliary rotor wheel 10 if appropriate, said speed differences being possible in principle as a result of the non-contact coupling.

The clutch part 27, which is fixedly connected to the compressor wheel 8, is expediently a permanent magnet or a squirrel-cage rotor. The second clutch part 28 on the auxiliary rotor wheel 10 is advantageously a ring magnet with a plurality of pole pairs, or has magnetically conductive windings or magnetically conductive plates which are stacked to form packs. The magnetic field between the clutch parts 28 and 27 which generates the coupling torque between said components is always available in the case of a permanent magnet, or in the case of a squirrel-cage rotor is generated by the speed difference between the compressor wheel and the auxiliary rotor wheel.

The auxiliary rotor wheel 10 is in the form of a turbine wheel and has radially outwardly extending blades 20 at the inlet flow side of the auxiliary rotor wheel. Mounted upstream of the blades 20 of the auxiliary rotor wheel 10 is a radially encompassing guide vane structure 21 which is fixedly retained on a contoured ring 22. The guide vane structure 21 can be inserted into a die plate 23 which is fixedly connected to the adjusting element 11. The contoured ring 22 is retained on guide pins 24 which extend axially parallel to the longitudinal axis of the compressor, with the guide pins being coupled to the die plate 23 in a captive fashion but so as to be relatively moveable. Spring elements 25 disposed around the guide pins 24 are in the form of compression springs, which are supported at one end on the contoured ring 22 and, at the other end, on a projection of the die plate 23, and biasing the contoured ring 22 and the guide vane structure 21 into the maximum opening position of the guide vane structure 21 shown in FIG. 2, wherein the effective inlet cross section through the guide vane structure assumes a maximum value.

FIG. 2 illustrates the auxiliary rotor wheel 10 in its decoupled position in which it is not connected to the compressor wheel 8. In this position, the coupling element 26 is spaced apart from the compressor wheel. The decoupled position equates to an inoperative position in which the clutch parts 27 and 28 of the magnetic clutch 26 are not in engagement. The guide vane structure 21 is also in the decoupled position when it is in the inoperative position.

In the inoperative position, the contoured ring 22 is spaced apart from a housing-side duct wall 30. This opens a semi-axial flow path in the compressor inlet duct, via which combustion air is supplied directly, in the direction of the arrow 31, to the inlet end of the compressor wheel 8 while bypassing the guide vane structure 21 and the auxiliary rotor wheel 10. This operating mode, in which the compressor wheel 8 is driven via the shaft 9 by the turbine wheel of the exhaust gas turbine, is implemented at relatively high engine loads and engine speeds.

At relatively low loads and speeds, the auxiliary rotor wheel 10, as illustrated in FIG. 3, is moved into the coupled position with the compressor wheel 8; at the same time, the contoured ring 22 is adjusted into contact with the duct wall 30, with a seal ring 32 being held in the contoured ring 22 to provide a flow-tight closure, said sealing ring 32 being placed in direct contact with the duct wall 30. The semi-axial flow path is in this case closed, so that the combustion air must travel along the path via the guide vane structure 21 and the auxiliary rotor wheel 10.

The die plate 23 and the auxiliary rotor wheel 10 are adjusted by the adjusting element 11 axially in the direction of the arrow 12, with the auxiliary rotor wheel 10 being mounted so as to be rotatable relative to the adjusting element 11 and the guide vane structure 21 and the further associated components. Formed between the wheel rear side of the auxiliary rotor wheel 10 and a wall of a housing section 33, which also supports the die plate 23 and is acted on by the adjusting element 11, is a narrow buffer volume which, in order to prevent lubricating oil from being sucked out, is pressurized with the pressure of the accumulating space in the compressor inlet duct upstream of the auxiliary rotor wheel 10.

Only a narrow axial gap is open in the guide vane structure 21, with combustion air flowing though this narrow axial gap and impinging at a high peripheral speed on the blades 20 of the auxiliary rotor wheel 10. The guide vane structure 21 is pushed to a large extent into the die plate 23 and is therefore situated in its blocking position which reduces the effective inlet-flow cross section. In this position, a high pressure drop prevails in the compressor inlet duct 19 between the region upstream of the guide vane structure 21 and the region downstream of the blades 20 of the auxiliary rotor wheel 10. The pressure ratio is expediently at least 4, meaning that there is at least four times as high a pressure upstream of the guide vane structure 21 as there is downstream thereof. This operating mode is also referred to as a cold air turbine mode which is implemented close to the engine idle speed range. In the cold air turbine mode, the pressure drop across the compressor is utilized to drive the auxiliary rotor wheel 10, with the rotational movement of the auxiliary rotor wheel being transmitted via the magnetic clutch 26 to the compressor wheel 8. In this way, the charger speed is kept at an increased level even at low loads and speeds of the internal combustion engine.

What is claimed is:

1. A compressor in an exhaust gas turbo-charger for an internal combustion engine, including a compressor wheel (8) which is rotatably mounted in a compressor inlet duct (19) of the compressor (5) having a duct wall (30) defining a semi-axial inlet flow path to the compressor wheel (8), an exhaust gas turbine (3) with a turbine wheel for transmitting rotation between the turbine wheel and the compressor wheel (8) via a shaft (9) and an auxiliary turbine rotor wheel (10) rotatably supported upstream of, and coaxially with, the compressor wheel (8), the auxiliary turbine rotor wheel (8) being driven by intake air during low power engine operation and connectable to the compressor wheel (8), the auxiliary turbine rotor wheel (10) includes a guide vane structure (21) mounted on a contoured ring (22) arranged in an inlet flow passage for the auxiliary turbine rotor wheel (10), the auxiliary turbine rotor wheel (10) being axially adjustable between a coupled position with the compressor wheel (8) and a decoupled position where axial adjustment of the auxiliary turbine rotor wheel (10) varies the effective flow cross-section;

wherein, in the coupled position, the compressor wheel (8) and the auxiliary rotor wheel (10) are rotationally connected without contact by means of a magnetic clutch (26) for driving the compressor wheel (8) and the auxiliary turbine rotor wheel (10) is moved into contact with the duct wall (30), thereby closing the semi-axial flow path to the compressor wheel (8) and directing the inlet flow to the compressor wheel (8) through the auxiliary turbine rotor wheel (10); and, in the decoupled position, the auxiliary turbine rotor wheel (10) is decoupled from the compressor wheel (8).

2. The compressor as claimed in claim 1, wherein the magnetic clutch (26) comprises two clutch parts (27, 28) which interact in the coupled position and are fixedly connected to the compressor wheel (8) and to the auxiliary rotor wheel (10) respectively.

3. The compressor as claimed in claim 2, wherein the two clutch parts (27, 28) of the magnetic clutch (26) are rotationally symmetrical.

4. The compressor as claimed in claim 3, wherein the auxiliary turbine rotor wheel (10) includes an axial recess and one clutch part (27) is cylindrical and, in the coupled position, projects into the recess in the auxiliary turbine rotor wheel (10).

5. The compressor as claimed in claim 4, wherein one of the clutch parts (28) is a permanent magnet.

6. The compressor as claimed in claim 4, wherein one of the clutch parts (28) is in the form of a squirrel-cage rotor (27).

7. The compressor as claimed in 4, wherein one clutch part (28) is embodied as a ring magnet.

8. The compressor as claimed in claim 4, wherein one clutch part (28) has magnetically conductive windings

\* \* \* \* \*